T. J. MAYALL.

Composition for the Manufacture of Emery Sticks and Wheels.

No. 1,288. Reissued March 18, 1862.

Witnesses
Joseph Gavett
Albert W. Brown.

Inventor.
Thos J. Mayall

UNITED STATES PATENT OFFICE.

THOMAS J. MAYALL, OF ROXBURY, MASSACHUSETTS, ASSIGNOR TO JOHN H. CHEEVER, OF NEW YORK, N. Y.

IMPROVED COMPOSITION FOR THE MANUFACTURE OF EMERY STICKS AND WHEELS.

Specification forming part of Letters Patent No. 24,039, dated May 17, 1859; Reissue No. 1,288, dated March 18, 1862.

*To all whom it may concern:*

Be it known that I, THOMAS J. MAYALL, of Roxbury, in the county of Norfolk and State of Massachusetts, have invented a new and useful composition of matter or compound for the formation of emery wheels, emery-sticks and other like emery-tools for grinding, cutting, and polishing metals, glass, and other hard substances; and I hereby declare that the following description, taken in connection with the accompanying drawings hereinafter referred to, forms a full and exact description of the same, wherein I have set forth the nature and principles of my improvements by which my invention may l e distinguished from all others of a similar class, together with such parts as I claim and desire to have secured to me by Letters Patent.

Figure 2:
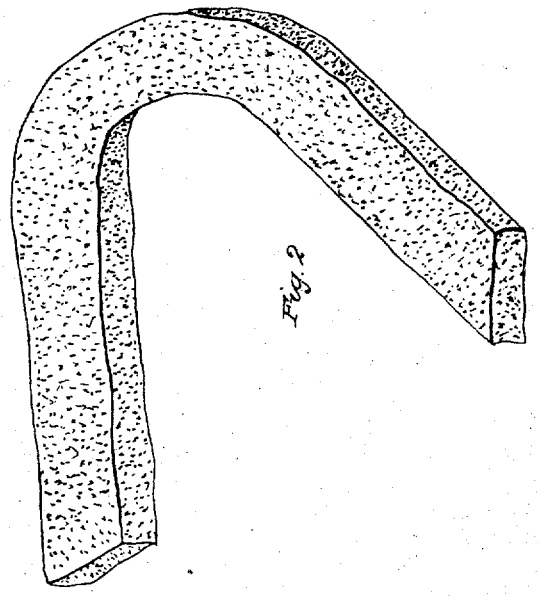
Figure 1:
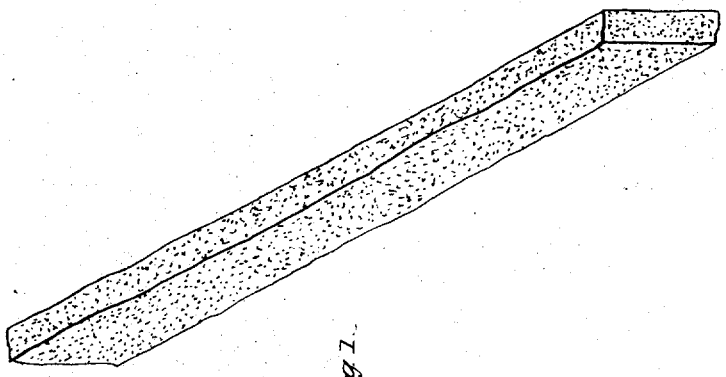

The figures of the accompanying plate of drawings represent my improvements, Figure 1 being a perspective view of a rigid emery-stick; Fig. 2, that of a flexible emery-stick.

My invention consists in the production of a new compound or composition of matter applicable to the manufacture of sticks, wheels, or other tools for grinding, cutting, or polishing metals, glass, or other hard substances by combining gutta-percha and sulphur with powdered emery.

My invention further consists in the production of a new compound or composition of matter applicable to the manufacture of sticks, wheels, or other tools for polishing, grinding, or cutting metals, glass, or other hard substances by combining gutta-percha and sulphur with powdered emery and olive oil, or its eq ivalent.

In preparing this composition I take gutta-percha and purify it from the oil which is combined with it in its native state, and which is injurious to my composition, either by heating it or by any other method. I then combine it with su'phur in the proportion of eight pounds of gutta-percha to four pounds of sulphur, and with this I mix forty pounds of powdered emery and half a pound of pure olive-oil. By this composition I am enabled to form a substance which combines with and holds the emery with the greatest firmness, and which can be molded and heated into any desired form. This composition is different from and has great advantages over india-rubber emery compounds, particularly in the amount of sulphur which I am enabled to use, and since I am enabled to use a less amount of gum the wheels and sticks in use do not become gummed or clogged, but preserve their gritty and polishing surface. When these ingredients have been perfectly combined and mixed together, I place the composition in iron molds and heat it from six to seven hours at a temperature of 300° Fahrenheit, and the composition becomes hard, firm, and fit for use. I mold this composition before heating into the form of wheels or sticks, or into any other form suitable to cutting, grinding, or polishing of metals or other hard substances.

Having thus described my invention and the manner in which the same is or may be carried into effect, I would here observe that although I have described the composition that, according to my knowledge and belief, is the best, yet I do not wish to be considered as confining myself to the precise proportions hereinbefore indicated, it being obvious that changes may be effected without materially affecting the composition or result of my invention; but what I do consider as my invention is the production of an emery compound irrespective of the proportions of its several ingredients, consisting, first, of gutta-percha, sulphur, and emery; second, of gutta-percha, sulphur, emery, and olive-oil, or its equivalent.

I shall therefore state my claims as follows:

1. The production of a new compound or composition of matter applicable to the manufacture of sticks, wheels, or other tools, for grinding, cutting, or polishing metals, glass or other hard substances, by combining gutta-percha and sulphur with powdered emery.

2. The production of a new compound or composition of matter, applicable to the manufacture of sticks, wheels, or other tools, for polishing, grinding, or cutting metals, glass, or other hard substances, by combining gutta-percha and sulphur with powdered emery and olive-oil, or its equivalent.

THOS. J. MAYALL.

Witnesses:

JOSEPH GAVETT,

A. W. BROWN.